(12) United States Patent
Dahlin et al.

(10) Patent No.: US 6,854,576 B2
(45) Date of Patent: *Feb. 15, 2005

(54) OUTBOARD CLUTCH ASSEMBLY SUPPORT AND CLUTCH HUB BRAKE

(76) Inventors: John H. Dahlin, P.O. Box 61, LaGrangeville, NY (US) 12540; Stephen J. Grotzinger, 6 Baris La., Hopewell Junction, NY (US) 12533

( * ) Notice: Subject to any disclaimer, the term of this patent is extended or adjusted under 35 U.S.C. 154(b) by 0 days.

This patent is subject to a terminal disclaimer.

(21) Appl. No.: 10/094,390

(22) Filed: Mar. 8, 2002

(65) Prior Publication Data

US 2002/0134633 A1 Sep. 26, 2002

Related U.S. Application Data

(63) Continuation-in-part of application No. 09/476,534, filed on Jan. 3, 2000, now Pat. No. 6,474,459.

(51) Int. Cl.$^7$ .............................................. F16D 13/58
(52) U.S. Cl. ............................... 192/13 R; 192/110 B; 192/115
(58) Field of Search .......................... 192/70.13, 70.27, 192/96, 110 B, 115, 13 R

(56) References Cited

U.S. PATENT DOCUMENTS

| | | | | |
|---|---|---|---|---|
| 1,590,791 A | * | 6/1926 | Woolson | 192/18 R |
| 3,179,217 A | * | 4/1965 | Root | 192/13 R |
| 3,722,643 A | * | 3/1973 | Kempf et al. | 192/13 R |
| 4,732,251 A | | 3/1988 | Tipton | 192/70.24 |
| 5,033,598 A | | 7/1991 | Tipton | 192/70.24 |
| 5,322,148 A | | 6/1994 | Fernandez | 192/70.13 |
| 5,740,773 A | | 4/1998 | Ohshige | 123/198 DA |
| 6,102,183 A | | 8/2000 | Gerken | 192/91 A |
| 6,474,459 B1 | * | 11/2002 | Dahlin et al. | 192/110 B |
| 6,598,705 B2 | * | 7/2003 | Ito et al. | 184/6.5 |

OTHER PUBLICATIONS

Rivera Engineering, Photo of Jim McLure at Newport News, VA, Pro Competition 1985.
Figures from Harley–Davidson Manuals: for 1971–84 Sportster XL, Fig. 6–8 Clutch; for 1986–90 Sportster XL, Fig. 6–10 Clutch Cable Removal & Installation; for 1986–90 Sportster XL, Fig. 6–13 Clutch; for 1971–84 Sportster XL Fig. 6–5 Clutch Release Mechansim; for 1984–89 Big Twin, Fig. 6–25 Wet Clutch—Exploded View; for 1991–93 Sportster XL Fig. 6–14 Clutch Release Mechanism —1993 Models; for 1994–to Sportster XL Fig. 6–17 Clutch Release Mechanism—1994 Models; for 91–93, 94–to Sportster XL Fig. 6–19 Clutch Assembly 1993/1994.

* cited by examiner

Primary Examiner—Richard M. Lorence
(74) Attorney, Agent, or Firm—Stephen G. Matzuk

(57) ABSTRACT

A clutch assembly outboard support comprising at least one bearing mounted to an outer structure in or near the clutch assembly, e.g. the clutch housing or protective cover, and mounted to or impacting upon the clutch assembly itself, to relieve the force applied to the inner support bearing of the transmission input shaft and to restrict clutch assembly motion regardless of the engine, starter drive or other forces applied to it. The increased clutch stability and alignment according to the present invention provide more complete clutch disengagement allowing for significantly improved transmission shifting characteristics by reducing or eliminating clutch drag during shifting. Furthermore, the various embodiments according to the present invention substantially enhance the bearing life, increase the positional stability of the clutch assembly in its normal operation, enhance the useful life of the clutch components, reduce wear on the transmission and starter assemblies, provide increased starter efficiency, reduce drive-line backlash, and potentially enhance performance by increasing available power by reducing power lost in the clutch assembly and associated bearing and connecting elements, without disturbing traditional outboard clutch deployment. Additional inventive embodiments include clutch hub braking mechanisms to further enhance clutch operation.

18 Claims, 7 Drawing Sheets

OUTBOARD CLUTCH ASSEMBLY SUPPORT AND CLUTCH HUB BRAKE

This is a Continuation-In-Part patent application of U.S. patent application Ser. No. 09/476,534 filed Jan. 3, 2000 now U.S. Pat. No. 6,474,459 B1.

FIELD OF THE INVENTION

The present invention relates to the support of clutch assemblies, in particular, to outwardly supporting motorcycle clutch assemblies.

BACKGROUND OF THE INVENTION

A typical clutch assembly incorporates a rotating clutch disk plate selectively secured against a facing plate. This facing plate is directly secured to the fly wheel. The clutch disk plate is connected via a spline to the main shaft, which extends in opposite directions and through both plates. One end of the main shaft goes through the clutch disk plate and into the transmission. The other end goes through the facing plate, the flywheel and on into the crankshaft of the engine. There is a support bearing near each of the plates to support the main shaft and accurately position the clutch disk plate. However, certain manufacturers of motorcycles have elected to place the clutch assemblies so that they are supported with only a single bearing on the inward side, providing only limited support to the entire clutch assembly and transmission input shaft or main shaft.

To illustrate a common set of problems found in a multitude of motorcycle clutch designs, we will refer to a "typical" motorcycle wet clutch assembly, which is composed of an adjusting plate, spring assembly, pressure plate, adjusting screw, disk assembly, inner hub, clutch shell, pilot bearing, and transmission input shaft or main shaft. The disk assembly consists of 6–8 fiber disks "stacked" in a parallel arrangement along a common axis between parallel metal plates. The disk assembly is connected to the inner hub via splines on the metal disks. The disk assembly is connected to the clutch shell via extended legs on the fiber disks. The clutch is released or disengaged by the push rod exerting force on the pressure plate, which is permitted to move outwardly, by compressing the spring assembly. The spring assembly being fixed outwardly by the adjusting plate, which is secured via bolts to the inner hub. The amount of compression being determined by the positioning of this adjustment plate relative to the bosses on the inner hub. Different positioning being determined by shims or an adjustment capability built into the adjustment plate itself. Disengagement permits the inner hub to move freely of the clutch shell and rotate freely on the pilot bearing. The inner hub is directly connected to the end of the transmission input shaft via a keyway and nut. The main shaft then proceeds inwardly through the pilot bearing in the clutch shell, then through an inward support bearing and subsequently into the interior of the transmission output shaft and subsequently into the transmission. The clutch shell is connected to the engine by a chain which attaches to the drive sprocket on the clutch shell. The disengagement of the rotation of the clutch shell from the inner hub is what achieves the disengagement of the motor from the transmission. However, the entire clutch assembly is outwardly positioned from the inward support bearing, its only means of support.

As previously noted, there are a multitude of motorcycle clutch designs, and a variety of terminology used in shop manuals and elsewhere to describe them. In our discussion, we shall rely on the fact that the outer clutch shell drives the inner clutch hub when the clutch is engaged. That is, the clutch shell does the driving and the inner hub gets driven. Consequently, the clutch disks, which interconnect with the clutch shell, will be referred to as the drive plates. These are typically made of fiber. The clutch disks, which interconnect with the inner clutch hub, will be referred to as the driven plates. These are typically made of steel. However, in some clutch designs the roles of the steel and fiber plates are interchanged. In our "typical" wet clutch design the drive plates are notched at their peripheries to receive the keyways formed in the clutch shell. In other designs, the periphery of the drive plate may be a spline, which interfaces with a mating spine in the clutch shell. Similarly there are various ways to mate the driven plates with the driven inner clutch hub. Also in our "typical" wet clutch design the spring assembly is fixed outwardly by the adjusting plate, which is secured via bolts to the inner hub. In other designs, there may be no adjusting plate. The spring assembly being restricted from an outward movement by a retaining ring, which is seated onto the spring and slips into a receiving slot in the inner hub thereby sandwiching the pressure plate between the clutch plates and spring, by utilizing the inner hub directly. In the "typical" wet clutch design the clutch shell is connected to the engine by a chain, which attaches to the drive sprocket on the clutch shell. In "dry" clutch designs, a belt often replaces this chain. In the "typical" wet clutch design the inner hub is directly connected to the end of the transmission input shaft via a keyway and nut. In other designs, this connection is implemented using a snap ring in lieu of a nut. In the "typical" wet clutch design, a pushing force actuated from the far or inward side of the pressure plate disengages the clutch. In other clutch designs the pushing force is actuated from the near or outward side of the pressure plate. In yet other designs, a pulling force actuated from the near side is used. Many of these alternative designs will be addressed subsequently.

Returning now to the use of our "typical" wet clutch design, we will illustrate a common set of problems found in motorcycle clutches. The energy from the engine is typically supplied by a chain drive which pulls the entire clutch assembly forward. This forward movement, of the entire clutch assembly, presses the transmission input shaft against one side of the inward support bearing, causing rapid wear. This forward movement of the clutch also causes misalignment of the clutch release elements and consequently the clutch is no longer able to be fully disengaged. Without proper disengagement of the clutch, shifting up or down cannot be done without grinding of gears, clanking, or other difficulties since the clutch is now binding or dragging when it should be completely disengaged. The forward movement of the clutch assembly also causes unnecessary transmission wear. The transmission input shaft passes through the transmission output shaft and on into the transmission. Any misalignment or binding of these two shafts causes premature wearing of these shafts and reduces the overall power output of the motorcycle. As the transmission input shaft enters into the transmission, its misalignment will also affect any gears, bushings, and bearings which it impacts upon. All of these problems, caused by the forward movement of the clutch assembly, are exacerbated as wear occurs and accumulates on the inward support bearing.

A further problem is looseness in the linkage between the rear (drive) wheel and the engine, commonly called "backlash." A certain amount of backlash is necessary. However, it is desirable to minimize this looseness as much as possible. Fore and aft motion of the clutch assembly relative to the engine and the rear wheel provide a significant component of motorcycle drive train backlash. An unstabilized clutch assembly significantly contributes to the drive train backlash.

An additional problem in motorcycle clutches is starter drive inefficiency. The motorcycle starter drive engages the ring gear of the clutch shell of the clutch assembly which also is connected via the drive sprocket to the engine via chain. If the motorcycle is started while in neutral, the starter drive will force the clutch assembly away from the starter drive and cause a binding of the gears in the starter drive and ring gear. If the motorcycle is started while in gear, the engagement of the clutch shell by the starter drive, again urges the clutch to move away from the starter drive, causing the clutch to partially engage, increasing the energy needed to start the motorcycle engine.

Moreover, when disengaged, the motorcycle clutch permits the inner hub to spin from its own inertia, further delaying and/or interfering with smooth and efficient clutch and transmission operation.

SUMMARY OF THE INVENTION

The present invention provides several embodiments of clutch assembly outboard supports comprising at least one bearing mounted to an outer structure near or in the clutch assembly, and mounted to or impacting upon the clutch assembly itself, to relieve the force applied upon the inward support bearing and to restrict clutch assembly motion regardless of the engine, starter drive or other forces applied to it. Other embodiments include a clutch brake mechanism to further refine clutch operation. The embodiments according to the present invention substantially enhance the bearing life and increase the positional stability of the clutch assembly in its normal operation without disturbing traditional outboard clutch deployment. Furthermore, the increased clutch stability and alignment according to the present invention provide more complete clutch disengagement allowing for significantly improved transmission shifting characteristics by reducing or eliminating clutch drag during shifting. The embodiments according to the present invention reduce wear on the transmission and starter assemblies, provide increased starter efficiency, reduce drive line backlash, and potentially enhance performance by increasing available power.

BRIEF DESCRIPTION OF THE DRAWING

These and further features of the present invention will be better understood by reading the following Detailed Description together with the Drawing, wherein.

DETAILED DESCRIPTION OF THE INVENTION

Referring to 1991 and 1992 Softail model clutch as described in the official factory service manual, Harley-Davidson Part No. 99482-92, 1991, especially noting Figure 6–12 on page 6-9 therein, incorporated by reference, the stock (unmodified) embodiment and known as the 1990–1997 "Big Twin" model, a clutch of the axially engaging multiple-disk type includes a cylindrical, driver, clutch shell having an axis with a bearing in one end and a driven, clutch hub in the bearing. This driven clutch hub being secured to the main shaft by a nut. Alternating drive and driven clutch discs are disposed radially in the shell. The drive, friction discs are notched, or one could say have a spline, at their peripheries to receive the complementary spline in the clutch shell. The driven discs being of metal and with an inward spline to receive the complementary spline of the driven clutch hub. A clutch pressure plate and a spring means of urging the pressure plate to compress the discs together to engage the clutch, disengagement being accomplished by a pushing from the far side of the pressure plate.

Figure 1:
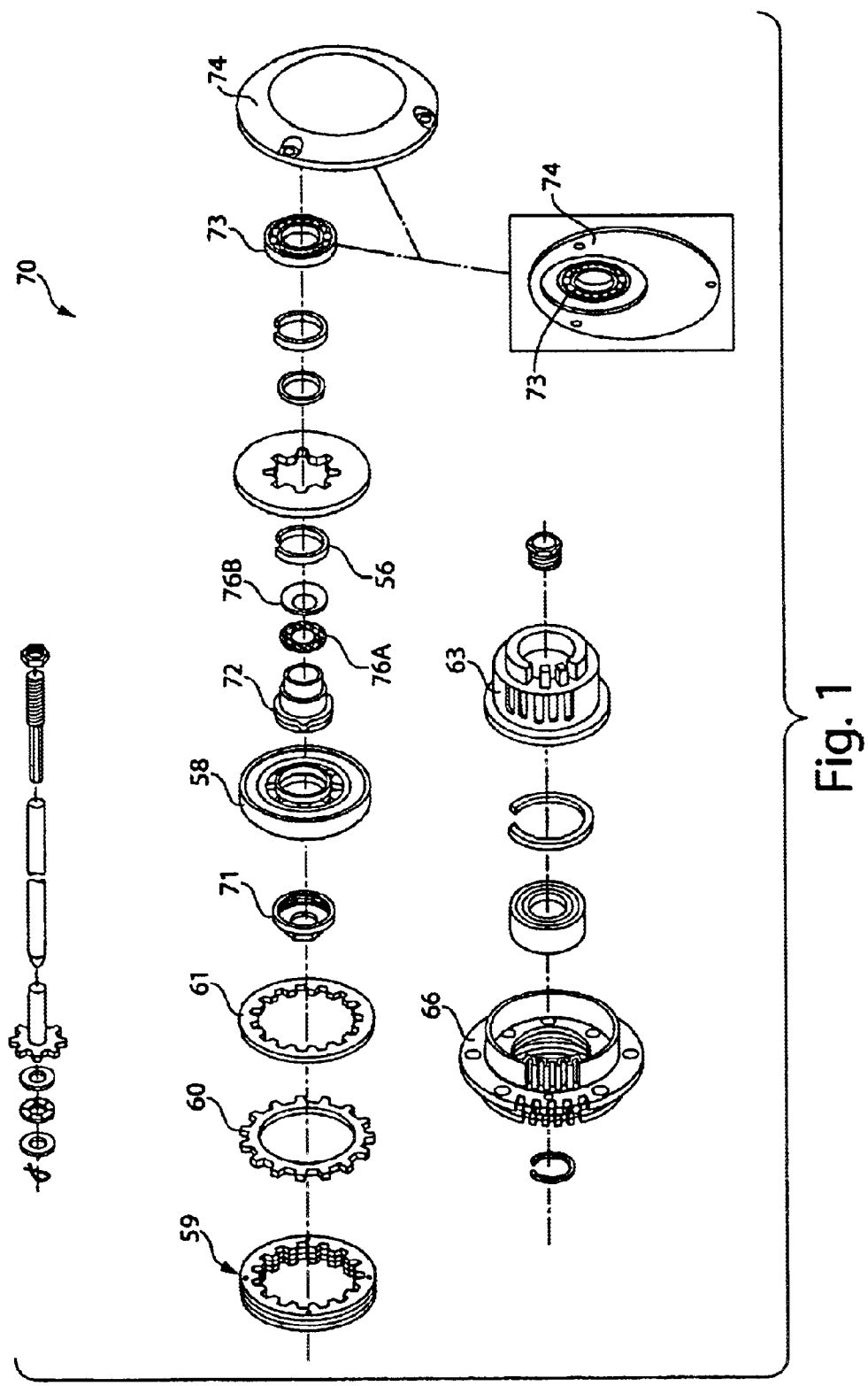
FIG. 1 is a perspective, exploded, partially cut-away view of one embodiment according to the present invention.

In some clutch designs such as this one, one may no longer want to directly attach to the inner clutch hub or the outer clutch shell. Rather one may exploit the tightly coupled relationship between the pressure plate and the inner clutch hub. This tight linkage is accomplished by employing a snap ring which slides into a receiving slot contained in pillars, which extend from the base of the clutch hub upward through openings in the central portion of the pressure plate, in the inner clutch hub and is retained there by the spring tension of a diaphragm spring which is also exerting force on a tightly fitted and encapsulating pressure plate. The resultant relationship is that the pressure plate is now tightly coupled with the inner clutch hub during both engagement and disengagement of the clutch mechanism. The clutch hub maintains a tight linkage with the outer clutch shell again via a bearing mechanism and additionally is rigidly attached (via a nut) to the transmission main shaft. One may now replace the original equipment release plate, which is traditionally retained in the pressure plate 58 by a snap ring arrangement, with a mandrel 72 tightly coupled to the pressure plate by a press fit or spanner nut 71 arrangement as shown in the embodiment 70 as shown in FIG. 1. This retrofit release plate mandrel 72 will also employ a protruding shaft, which will extend outwardly to be received in a bearing 73 rigidly attached in an access cover 74. The shaft will rotate in this bearing and in addition will also move axially fore/aft in the bearing during engagement/disengagement of the clutch mechanism.

In the original equipment design, during disengagement, the clutch handle is pulled and this causes the push rod components which are located behind or inboard of the clutch mechanism, to be forced outward into the adjusting screw, which is threaded into the release plate, which is attached to the pressure plate 58 via the snap ring 56. This outward movement of the pressure plate 58 is what releases the compression on the clutch plates (59, 60, and 61) and allows them and the clutch shell 66 and the clutch hub 63 to rotate freely of one another. As noted, this decompression is actuated by a force coming from behind and through the transmission, which is behind or inboard of the clutch mechanism. In Sportster or XL models, the source of this force is on the outboard side of the clutch mechanism and will be described subsequently.

This embodiment according to the present invention has the added benefit of maintaining the pressure plate 58 in perpendicular alignment with the transmission main shaft during disengagement, being guided by the bearing at the outboard end. One now relies on the original clutch design to maintain a tight coupling of the pressure plate 58 with the inner clutch hub 63, and the inner clutch hub 63 with both the outer clutch shell 66 and the transmission main shaft. One also relies on the original design to maintain a parallel arrangement of the encapsulated clutch disks (59, 60 and 61) within the pressure plate 58, inner clutch hub 63, and outer clutch shell 66. Thus all clutch elements would at all times be maintained in perpendicular alignment with the transmission main shaft.

A further inventive feature provides a clutch hub damping mechanism, or clutch hub brake also illustrated in FIG. 1. Ideally, while the motorcycle is at a stop and the clutch is released or disengaged, the inner clutch hub 66 should stop rotating after a short period of time. However, if a very low viscosity lubricant is used or the viscosity is reduced by heat this may not occur. The fore/aft axial motion of the mandrel 72 shaft in the rigidly mounted outboard bearing permits one to exercise a dampening effect on the inner clutch hub so that it will always come to a halt in a short period of time. Employing a two-phase (stepped diameter) shaft and a belleville washer 76B along with a fiber washer 76A (or rigid bronze washer), or a bronze Belleville washer provides the damping or braking to the clutch hub 63. The bottom part of the mandrel 72 shaft, near where it is rigidly mounted to the pressure plate (58), is constructed as a shelf and then narrowed to be mated with the bearing. A fiber washer 76A in then fitted over the narrow end of the shaft and comes to rest on the shelf in the shaft. The fiber washer acts as the brake material acting upon the shaft. A bronze washer (not shown) could also be used in lieu of the fiber washer. A Belleville washer 76B is then similarly placed on the shaft. By placing the shelf at the appropriate distance from the bearing race, the washers are free to rotate, while the clutch is engaged. However, during disengagement the pressure plate (58) and conjoined mandrel 72 are urged toward the outboard end and into the outboard bearing support. Force is now exerted on the belleville washer, sandwiched between the outer race of the bearing or the surface of the access cover 74 and the shelf on the mandrel shaft. The bearing 73 is rigidly mounted to the access cover 74 which is rigidly mounted to the clutch assembly housing. Thus force is ultimately applied against the clutch housing or clutch assembly housing. The fiber washer acts as a brake material between the shelf and the Belleville washer. The fiber washer 76A becomes unnecessary when the Belleville washer 76B is constructed from a softer material such as bronze. The outer race of the bearing 73, which is rigidly mounted to the access cover 74, which in turn is rigidly mounted to the clutch housing, does not move. It thus transfers the friction or damping force through the spring loaded Belleville washer and onto the mandrel shaft, which in turn transfers it to the pressure plate 58, which in turn transfers it to the inner clutch hub 63, which subsequently comes to a rotational stop. One could also employ a single, rigid bronze washer instead of the fiber one. Furthermore, one could choose the dimension so that the bronze washer would impact the face of the Access cover, once again achieving the desired braking effect.

Figure 2:
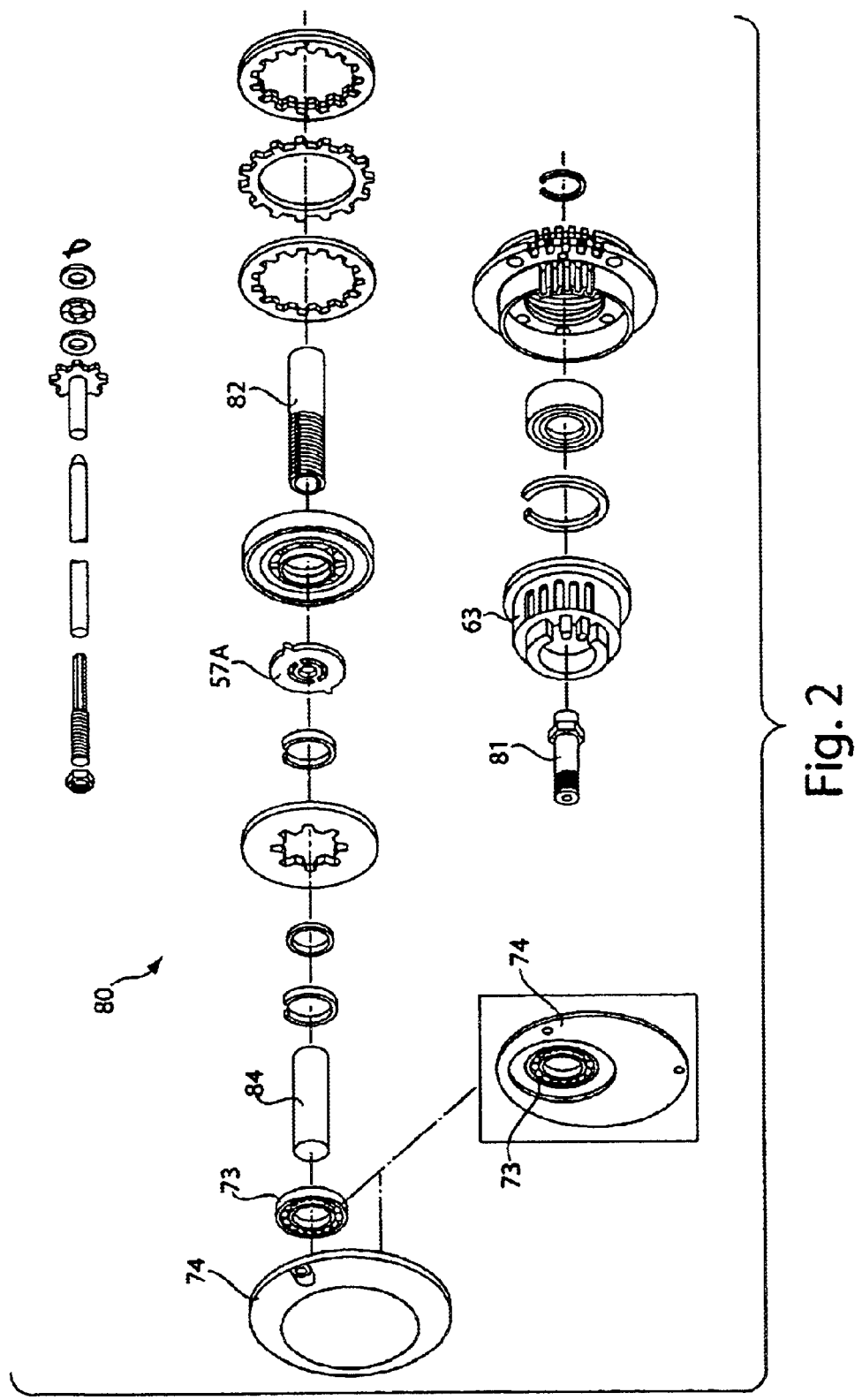
FIG. 2 is a perspective, exploded, partially cut-away view of an alternate embodiment according to the present invention.

FIG. 2 illustrates an alternative embodiment 80. The original equipment nut (main shaft, left hand thread) is replaced with an attachment nut shaft 81 according to this embodiment. The attachment nut shaft 81 attaches the clutch hub 63 to the transmission main shaft. The other end of the attachment nut shaft is threaded onto a release plate shaft 82.

The release plate shaft 82 is both threaded and slotted at the other end. These slots pass through the grooves cut into our release plate 57A and onward to be threaded into the access cover shaft 84. The other end of the access cover shaft 84 then slips into the bearing 73 retained in the access cover, 74. Thus a retrofit kit according to the present invention would include the attachment nut shaft 81, a release plate shaft 82, a slotted release plate 57A, an access cover shaft 84, and an access cover 74 with press fit bearing 73.

In the prior patent application of Dahlin et. al. January 2000 incorporated by reference, the embodiment of the invention for models for the years 1965 to early 1984 and late 1984 to 1989 provide a mandrel that is attached directly to the inner clutch hub. A protruding shaft in this mandrel is then supported at the outboard end by a bearing mounted to a rigid access cover. Although the shaft does rotate within the bearing, there is no fore/aft movement of the shaft within the outboard bearing in this design. The inner clutch hub to which the mandrel is rigidly secured, is also interconnected to the clutch shell on the inboard side with a bearing relationship. The clutch hub is then rigidly attached to the transmission main shaft. So long as the clutch hub is linked to the clutch shell, so as to maintain a parallel relationship amongst their faces, this type of design maintains perpendicular relationship of the clutch hub and the clutch shell to the transmission main shaft. Accordingly, all clutch components would move in a perpendicular motion relative to the transmission main shaft during disengagement.

Figure 3:
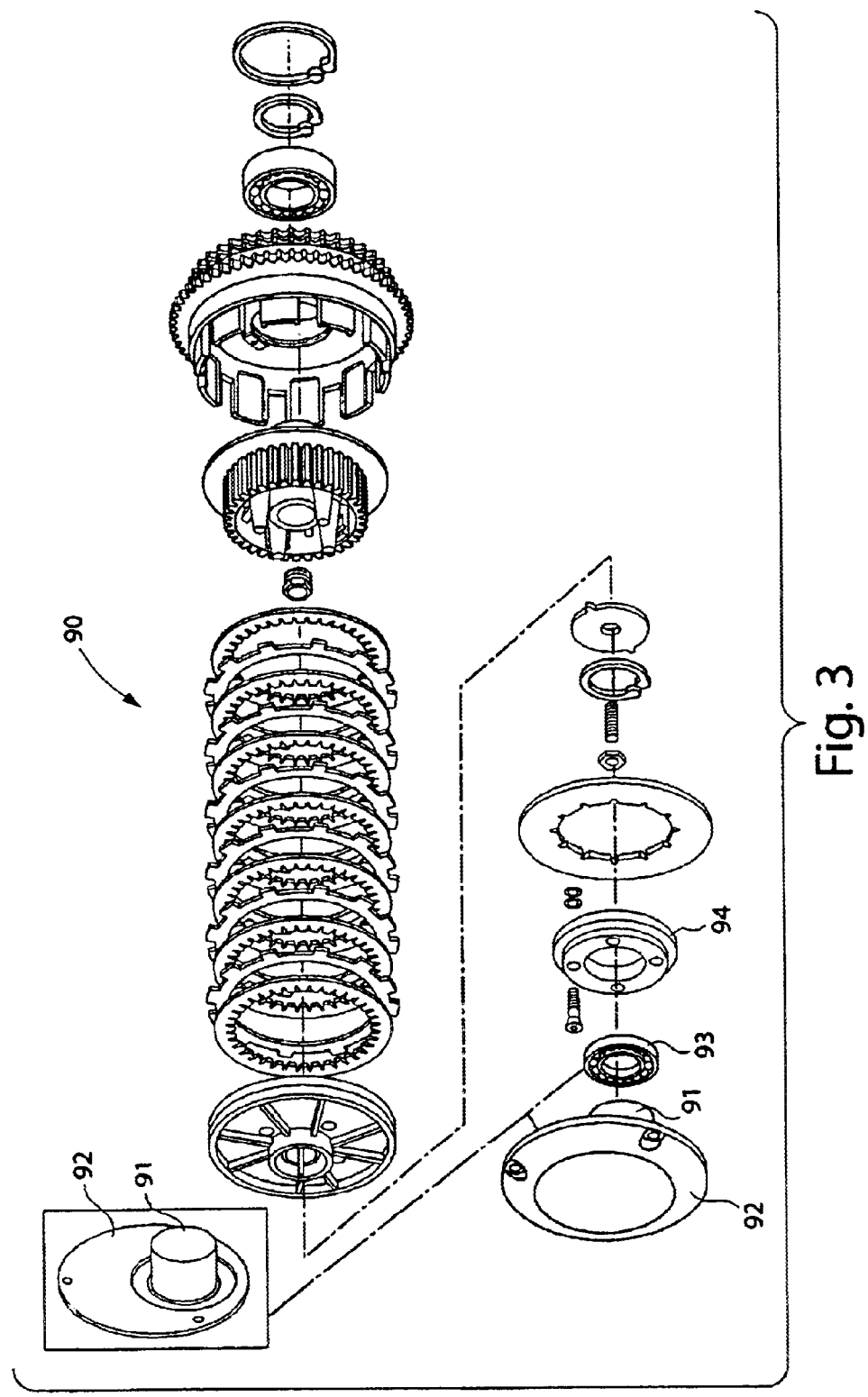
FIG. 3 is a perspective, exploded view of a further alternate embodiment according to the present invention.

Alternatively one may reverse the roles of the access cover and mandrel 94, as is illustrated in the embodiment 90 of FIG. 3. That is, a solid shaft 91 is machined out as an integral part of the access cover 92 or is press fit into the access cover 92. This shaft is then received by a bearing 93, which is press fit into the modified adjuster plate 94.

Referring to 1984 to 1990 Sportster XL clutch as described in the official factory service manual, 1986 to 1990 XLH models, Harley-Davidson Part No. 99484-90, 1989, incorporated by reference especially noting Figure 6–10 on page 6-9 and Figure 6–13 on page 6-13 therein, we address a clutch of the axially engaging multiple-disk type including a cylindrical, driver, clutch shell having an axis with a bearing in one end and a driven, clutch hub in the bearing. This driven clutch hub being secured to the main shaft by a spacer and a retaining ring, and alternating driven and drive clutch discs disposed radially in the shell. The drive, friction discs notched at their peripheries to receive the keyways formed in the clutch shell, and the driven discs being of metal and with an inward spline to receive the complementary spline of the driven clutch hub. A clutch pressure plate and a spring means of urging the pressure plate to compress the discs together to engage the clutch, disengagement being accomplished by a pulling from the outboard side of the pressure plate.

In a late 1984 to 1990 Sportster XL, the clutch cable enters directly into the primary chain cover and attaches to the coupling. When the clutch handle is pulled, this pulls upon the outer ramp and it rolls upon the balls braced to the inner ramp. This rolling action moves the outer ramp axially outward, toward the access plug. This axially outward rise of the outer ramp pulls the adjusting screw with it. The clutch adjusting screw assembly is locked to the outer ramp with the nut and the lock plate. The lock plate is retained in a female hex configuration on the outer ramp by the spring, which is braced against the inside of the plug. This prohibits the hex nut from moving along the adjusting screw and thereby modifying the clutch adjustment. The clutch adjusting screw assembly pulls outwardly upon the pressure plate.

This outward movement of the pressure plate is what releases the encapsulated assembly of clutch plates. This is the manner in which the clutch is disengaged.

Figure 4:
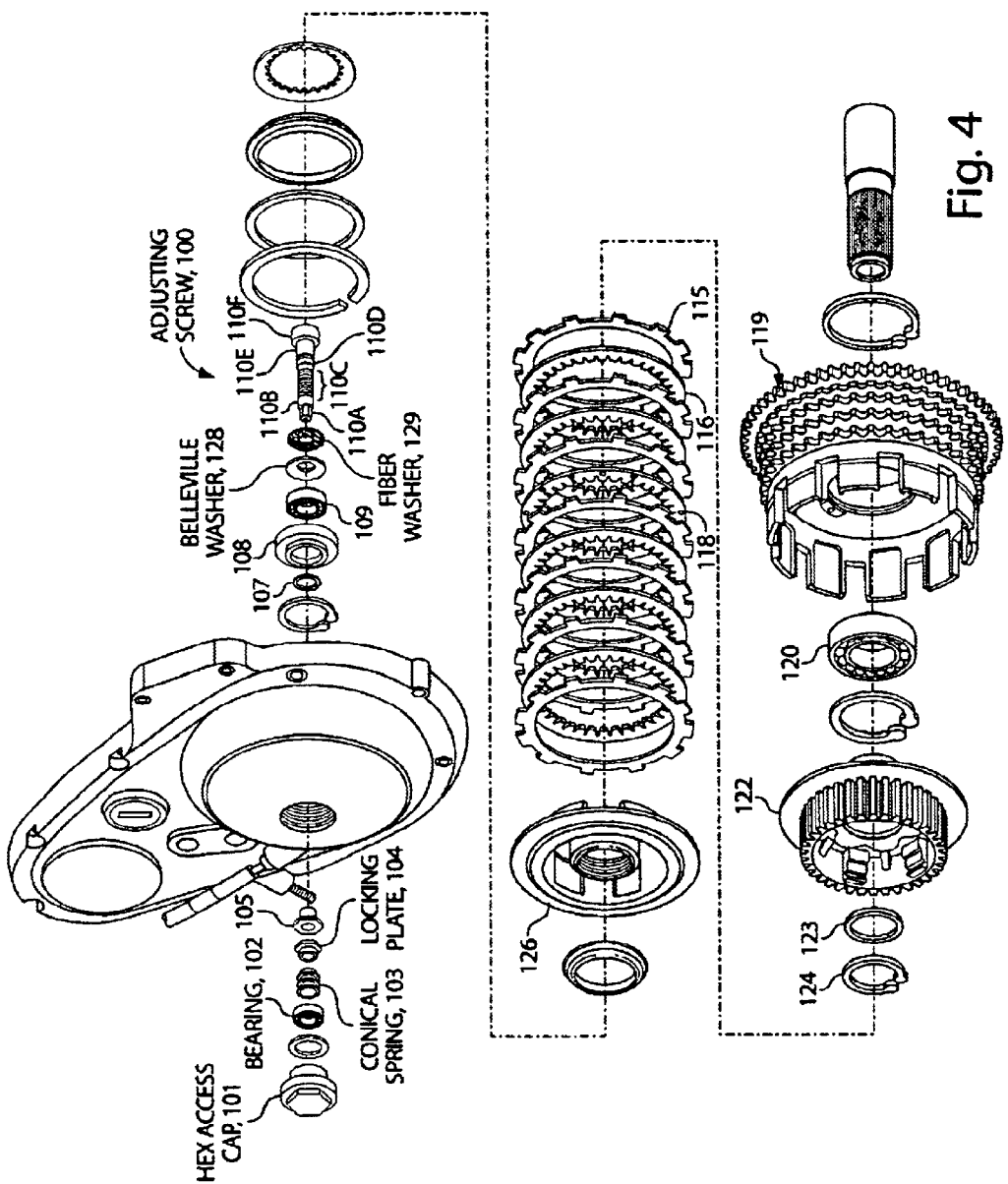
FIG. 4 is a perspective, exploded, partially cut-away view of a further alternate embodiment according to the present invention.

Referring to the embodiment 100, shown in FIG. 4, the original equipment adjusting screw is replaced with an adjusting screw 110 having an additional smooth segment added to it, which will extend outwardly to be received in a bearing 102. Traditionally, the adjustment screw 110 has a screwdriver slot in the outboard end to accomplish the adjustment. Alternatively, one may use a male hex fitting for this purpose. Thus the modified adjustment screw 110 is longer than the stock screw. It begins with a male hex head end section 110A and then transitions to a smooth surface area 110B, and then transitions to the threaded section 110C employed in the original design, then to a snap ring slot 110D, then to the smooth section 110E which slips into the bearing 109 and then transitions to a shelf 110F on the butt or inward end, which supplies the contact to pull upon the pressure plate 126. We replace the flat, slotted, stock access plug with a male hex access cap 101. This allows the cap to receive the longer adjusting screw, by drilling a hole into the hex head. In addition, we create a receptacle in the hex access cap 101 for a pressed fit bearing 102. The hex head 110A and the smooth section 110B of our adjusting screw protrude through and are supported by the bearing 102. To avoid collision with the bearing when the clutch is disengaged, the locking plate 104 is shortened. Also the folding in upon itself property of a conical, telescoping spring 103 is employed. This is necessary so the spring 103 does not become completely compressed. This would create a solid mass starting with the locking plate 104 through the completely compressed spring 103 and onto the surface of the bearing 102 in the access plug 101. This would prohibit the outward movement of the adjusting screw and thus prohibit the clutch from completely disengaging. Our design prohibits the spring from ever becoming completely compressed and any interference with complete disengagement. That is, it allows for the complete, and full disengagement motion of the adjusting screw.

In FIG. 4, the modified adjusting screw 110 slips into the pressure plate bearing 109 then outwardly passes through the bearing 109 and the guide 108 and is retained there with the retaining ring 107. The screw 110 then passes through the inner ramp and the outer ramp (obscured by the cover in this Figure) and is then threaded into the nut 105 and then passes through the lock plate 104 and conical spring 103 and then outwardly through the bearing 102 and into the hex head of the modified access cap 101. There are 'flat' portions of the generally cylindrical smooth and threaded portions 110B and 110C of the screw 110 which mate with similar flat portions in the locking plate 104 to prohibit the adjusting screw 110 from turning. This design is safe in that none of the retrofit parts can loosen and thus interfere with the proper functioning of the clutch mechanism.

If the spacer 123 is not of sufficient thickness then the clutch hub 122 can move significantly on the transmission main shaft. This movement of the clutch hub 122 can effect the main intent of our designs, which is to maintain a stable and completely perpendicular alignment of the entire clutch mechanism with the transmission main shaft through engagement and disengagement. This is corrected by replacing the original spacer with one 123 of the appropriate thickness. With this correction, the clutch hub 122 is maintained in a tight linkage with the transmission main shaft. The linkage between the clutch hub 122 and the clutch shell 119 being provided by the original equipment clutch shell bearing 120 mechanism.

One now has a tight coupling of the pressure plate 126 with the clutch hub 122. The clutch hub 122 is tightly linked with the clutch shell 119 via the clutch shell bearing 120. The clutch hub is now also tightly linked to the transmission main shaft with the appropriate width spacer 123 and the retaining ring 124. Furthermore, the entire clutch assembly is now being maintained in perpendicular alignment with the transmission mainshaft by its linkage to the modified adjustment screw 110, which is being retained in and guided by the bearing 102 at the outboard end. In this manner, a parallel arrangement of the encapsulated clutch disks (115, 116, and 118) within the pressure plate 126, the clutch hub 122, and the clutch shell 119 is maintained. Thus all clutch elements would at all times be maintained in perpendicular alignment with the transmission main shaft and the resultant benefits according to the present invention are thus realized.

This design according to this embodiment of the present invention also permits one to incorporate a damping mechanism or clutch hub brake, such as previously described with respect to FIG. 1, and now with respect to FIG. 4. Ideally, while the motorcycle is at a stop and the clutch is released or disengaged, the clutch hub 122 should stop rotating, after a short period of time. However, if a very low viscosity lubricant is used or the viscosity is reduced by heat this may not occur. The modified adjustment screw 110 is locked to the outer ramp with the nut 105, the lock plate 104, and the conical spring 103. The inner and outer ramps are secured to the clutch housing (e.g. 210 in FIG. 6) by a plate and screws. This in conjunction with the axially fore/aft motion of this modified adjustment screw 110 permits one to exercise a dampening effect on the clutch hub 122 so that it will always come to a halt in a short period of time. The first is to use a belleville washer 128 along with a fiber washer 129. The fiber washer 129 is placed over the narrower, bottom part of the adjusting screw 110, which enters into the bearing 109. It abuts on the shelf 110F on the bottom or inward side of the adjusting screw 110. This shelf 110F is used to apply the pressure upon the bearing 109 from the inboard side. A belleville washer 128 in then fitted over the narrow end of the modified adjusting screw 110 and is sandwiched between the fiber washer 129 abutting the shelf 110F of the adjusting screw 110 and the outer race of the bearing 109. The bearing 109 is attached to the pressure plate 126 using the guide 108 and the retaining ring 107. This attachment can be made rigid with the use of Locktite (TM) or equivalent. The fiber washer 129 acts as the brake material acting upon the shelf 110F of the adjusting screw 110, which is locked into place as previously described. The fiber and belleville washers 129, 128 are free to rotate, while the clutch is engaged. However, during disengagement the adjustment screw 110 is urged outward toward the pressure plate bearing 109. A spring-loaded force is now exerted by the Belleville washer 128, which is sandwiched between the outer race of the bearing 109 and the shelf 110F of the modified adjusting screw 110. The fiber washer acts as a brake material between the shelf 110F and the belleville washer 128. It becomes unnecessary when the belleville washer 128 is constructed from a softer material such as bronze. The outer race of the bearing is now rigidly related to the pressure plate 126 and does not move. The adjustment screw is locked into place and does not rotate. Thus a damping force, originating in the clutch housing, is transferred to the outer ramp and onto the modified adjusting screw 110 and its shelf 110F and on through the spring loaded belleville washer 128 and onto the outer race of the bearing 109, which in turn transfers it to the pressure plate 126, which transfers it to the clutch hub 122, which subsequently comes to a rotational stop.

As previously noted, other embodiments could employ a bronze washer instead of the fiber one. Or one could replace the fiber washer 129 and metal belleville washer 128 with an appropriate bronze belleville washer. A further embodiment would use a larger diameter, rigid, bronze washer, with the outer diameter chosen so as to impact a significant portion of the bottom or inward side of the pressure plate 126. The bronze washer would again be slipped over the narrower end of the adjustment screw 110 which slips into the releasing disc bearing 109. The bronze washer would be free to rotate, while the clutch is engaged. However, during disengagement the adjustment screw is urged outward toward the pressure plate 126 and its attached bearing 109. An outward force would now be exerted by the shelf 110F of the modified adjusting screw outward onto the bronze washer, and subsequently onto the bottom or inward face of the pressure plate 126. It would thus transfer the friction or damping directly to the pressure plate 126, which would transfer it to the clutch hub 122, which would subsequently come to a rotational stop, once again achieving the desired braking effect. This design has the added benefit of assisting the pressure plate 126 in maintaining a perpendicular alignment with the transmission main shaft during disengagement, being guided by the bearing 102 at the outboard end. If one prefers a spring-loaded force, a Belleville washer could once again be sandwiched between the bronze washer and the inner race of the bearing 109 in an inverted orientation. That is, the inner diameter of the Belleville washer would abut the inner race of the bearing 109 and the outer diameter of the belleville washer would abut the bronze washer.

An entire retrofit kit according to this embodiment of the present invention comprises an access cap 101 with press fit bearing 102, a conical spring 103, a locking plate 104, an adjusting screw 110, a bronze or fiber washer 129, and/or a Belleville washer 128, and a spacer 123.

As noted previously, there are several significant differences between the clutch mechanisms of a Big Twin and that of its a more economical related model known as the Sportster, some of these differences were previously illustrated in the prior embodiment 100. First, the primary chain lubricant for the clutch and the transmission lubricant are separated in a Big Twin. There is one type of lubricant for the clutch and another type of lubricant for the transmission. These two lubricants are physically prohibited from mixing. As previously noted in the Big Twin description, the clutch release mechanism is located inside the transmission side cover on the inboard side of the clutch and movement is extended through the transmission main shaft via a pushrod that then makes contact with the adjustment screw in the release plate which is affixed to the pressure plate. The pressure plate is thus forced outward from the inboard side of the clutch mechanism. In a Sportster the same lubricant is used for the clutch and the transmission and flows freely between these two mechanisms. In 1971 the manner in which the clutch is released in a Sportster was shifted from the inward side, as in a Big Twin, to the outward side. Referring to the official factory service manual, 1979 to 1985 XL/XR models, Harley-Davidson Part No. 99484-85, 1985, incorporated by reference especially noting Figure 6–5 on page 6-10 and Figure 6-6 on page 6-12 therein, and elsewhere, incorporated by reference, for a 1971 Sportster, the release cable and coil assembly enter directly into the primary chain case cover and attaches to the cable coupling. When the clutch handle is pulled, this pulls upon the release ramp and it rolls upon the ball bearings braced to the release ramp and lever. This rolling action moves the release ramp and lever inward, away from the slotted access plug. This axially inward compression of the release ramp and lever moves the adjusting screw, which is threaded into the release ramp and lever, inwardly along with it. The adjusting screw is locked to the release ramp and lever via the locknut and the lock washer. The release ramp and lever is secured to the primary chain case cover.

Now referring to the internal clutch mechanisms for a 1971-early 1984 Sportster, the adjusting screw then makes contact with the releasing disk collar. The releasing disk collar slips into and presses upon the releasing disk bearing which is press fit into the releasing disk. The releasing disk, which slides inside of the driven and drive clutch plates, then compresses the inner and outer springs and forces the pressure plate inward permitting the clutch disks to float freely and thus disengaging the clutch hub assembly from the clutch shell. The outer drive plate 164 is prohibited from leaving the clutch shell by the retaining ring, Engagement is accomplished by the compression exerted between the pressure plate and the outwardly restrained outer drive plate. Thus an outward force exerted inward into the clutch assembly achieves disengagement. In the Big Twin, an inward force being exerted through the transmission main shaft outward into the clutch assembly achieves disengagement. This arrangement was changed from a pushing motion to a pulling motion in the late 1984 and subsequent Sportster models and was described previously. However, the source of the activating force remained on the outboard side of the clutch assembly.

Referring to the clutch of the axially engaging multiple-disk type including a cylindrical, driver, clutch shell having an axis with a bearing in one end and a driven, clutch hub in the bearing. This driven clutch hub being secured to the main shaft by a hub nut. Alternating drive and driven clutch discs are disposed radially in the shell. The drive, friction discs notched at their peripheries to receive the keyways formed in the clutch shell. The driven discs being of metal and with an inward spline to receive the complementary spline of the driven clutch hub assembly. A clutch pressure plate and a spring means of urging the pressure plate to compress the discs together to engage the clutch, disengagement being accomplished by a pushing from the near side of the releasing disk.

Figure 5:
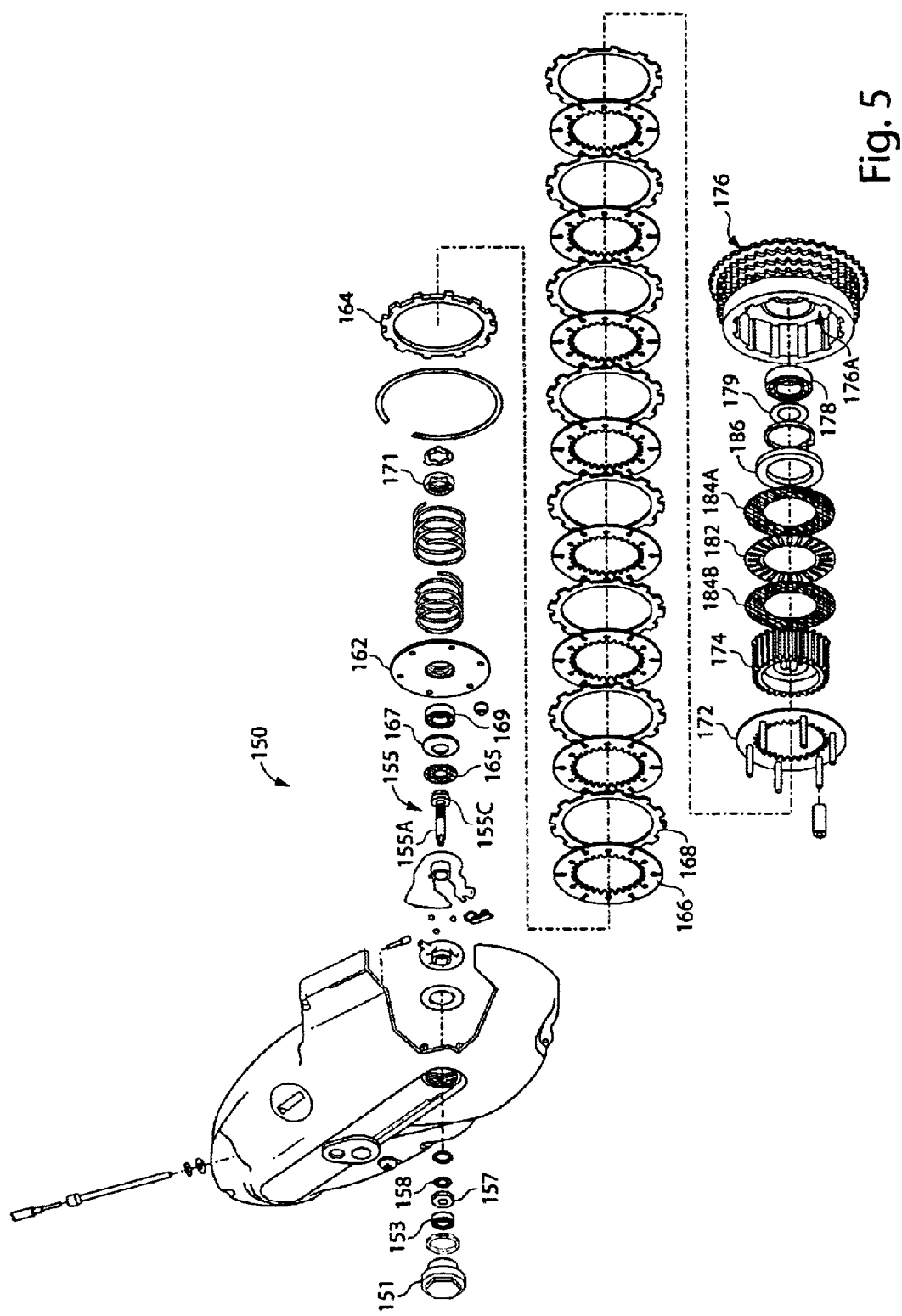
FIG. 5 is a perspective, exploded view of a further alternate embodiment according to the present invention.
Figure 6:
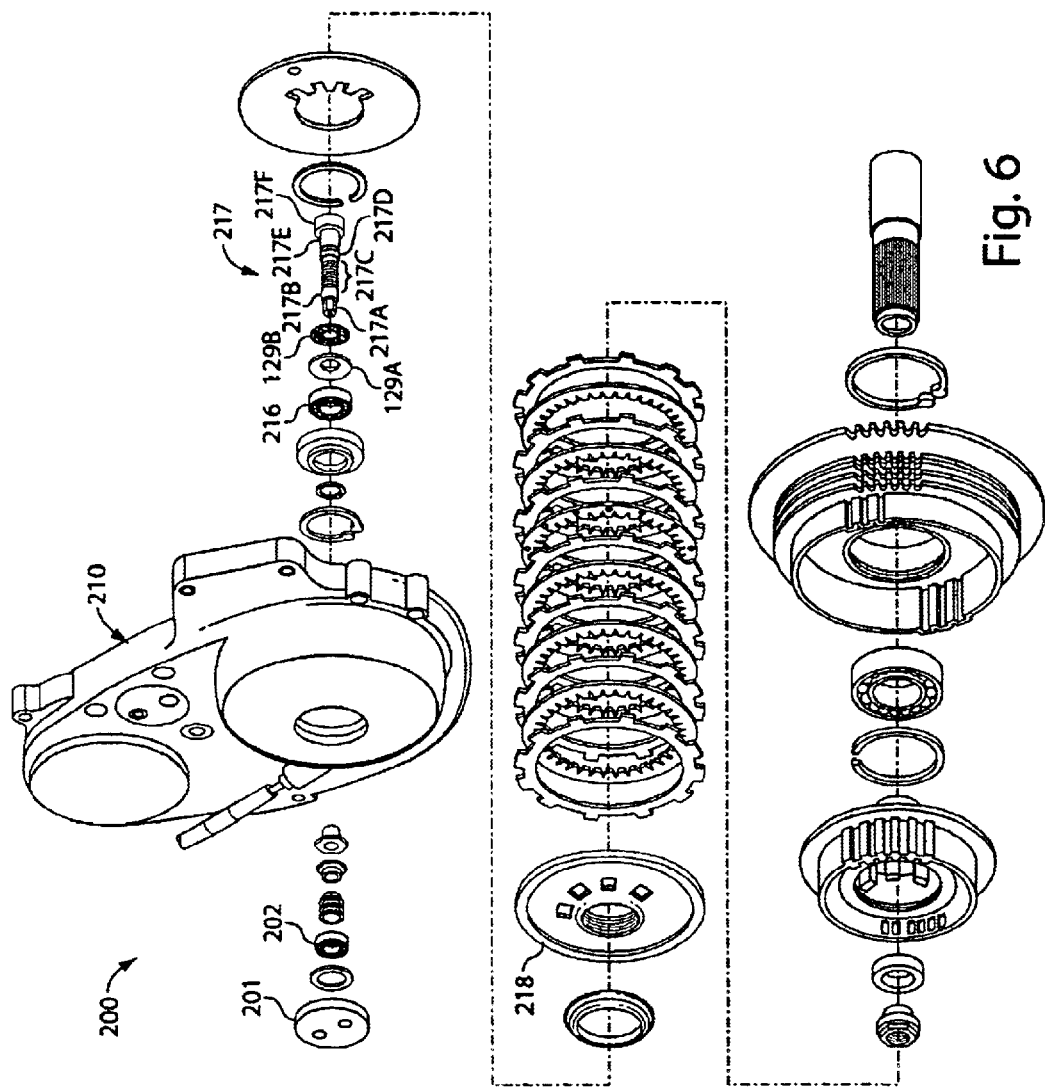
FIG. 6 is a perspective, exploded view of a further alternate embodiment according to the present invention.

Referring to the embodiment 150 shown in FIG. 5, in this clutch design, the releasing disk 162 and the pressure plate 172 are in a tightly coupled relationship which is further coupled to the inner clutch hub 174 via mating splines. The resultant relationship is that the releasing disk 162 is now tightly coupled with the inner clutch hub assembly 174 during both engagement and disengagement of the clutch mechanism. As noted in the Big Twin design, the clutch hub assembly 174 must be maintained in a tight linkage with the clutch shell 176. In this design, this is not the case and a linkage mechanism, which will be described subsequently, must also be supplied as part of the retrofit kit. Once this linkage mechanism is installed, the clutch hub assembly 174 will be maintained in a tight linkage with the clutch shell 176. This is also assisted by the original equipment clutch shell bearing 178 mechanism. The clutch hub assembly 174 is then rigidly attached to the transmission main shaft by nut 171. One may now replace the original equipment adjusting screw and releasing disc collar with one (155) that has these two functions joined into a single piece.

This fused adjustment screw and release collar 155 has an additional smooth segment 155A added to it, which will extend outwardly to be received in a bearing. The bearing is rigidly attached, by a press fit, to a modified access plug 151.

Traditionally, the adjustment screw has a screwdriver slot in the end to accomplish the adjustment. Alternatively, one may use a male hex fitting for this purpose. To summarize, our adjustment screw device begins with a male hex head end section and then transitions to a smooth surface area 155A, which will be received by the bearing, and then transitions to the threaded section employed in the original design and then transitions to the shelf 155C of the releasing disk collar, and then transitions to a narrower, smooth segment of the releasing disc collar, which slips into the releasing disc bearing 169 on the inward end. We replace the flat slotted stock access plug 151 with a male hex access cap. This allows the cap to receive the longer adjustment screw device 155, by drilling a hole into the hex head. In addition we create a receptacle in the hex access cap 151 for a pressed fit bearing. The hex head and the smooth section of our adjusting screw protrude through and are supported by this bearing. In FIG. 5 the adjusting screw 155 slips into the releasing disc bearing 169 then outwardly passes through the release ramp and lever, the release ramp, the washer, lock washer 158 and locknut 157 and then outwardly through the bearing and into the hex head of the access cap 151. This design is safe in that none of the retrofit parts can loosen and thus interfere with the proper functioning of the clutch mechanism.

This design also permits one to incorporate a damping clutch hub brake mechanism as described above with regard to FIGS. 1 and 4. Ideally, while the motorcycle is at a stop and the clutch is released or disengaged, the clutch hub assembly 174 should stop rotating, after a short period of time. However, if a very low viscosity lubricant is used or the viscosity is reduced by heat this may not occur. The axial fore/aft motion of the modified adjustment screw, which is locked to the releasing ramp and lever with the locknut 157 and the lock washer 158, permits one to exercise a dampening effect on the clutch hub assembly 174 so that it will always come to a halt in a short period of time. There are several designs that can accomplish this. The first is to use a belleville washer 167 along with a fiber washer 165. The fiber washer 165 is placed over the narrower, bottom part of the adjusting screw 155, which enters into releasing disc bearing 169. It abuts on the shelf 155C of the adjusting screw, which is used to apply pressure upon the releasing disc bearing 169 from the outward direction. A belleville washer 167 is then fitted over the narrow end of the adjusting screw 155 and is sandwiched between the fiber washer 165 abutting the shelf 155C of the adjusting screw 155 and the outer race of the releasing disc bearing 169. Recall that the releasing disc bearing 169 is rigidly attached to the releasing disc 162 by a press fit. The fiber washer 165 acts as the brake material acting upon the shelf 155C of the adjusting screw 155, which is locked into place by the locknut 157 and lock washer 158. The fiber and belleville washers 165, 167 are free to rotate, while the clutch is engaged. However, during disengagement the adjustment screw is urged inward toward the releasing disc bearing 169. A spring-loaded force is now exerted by the belleville washer 167, sandwiched between the outer race of the bearing 169 and the shelf of the releasing disc collar segment 155C of the adjusting screw 155. The fiber washer 165 acts as a brake material between the shelf 155C and the belleville washer 167. This fiber washer 165 is unnecessary when the belleville washer 167 is constructed from a softer material such as bronze. The outer race of the bearing 169 is rigidly mounted to the releasing disc 162 and does not move. The adjustment screw is locked into place by the locknut 157 and lock washer 158 and does not rotate. Thus a damping force from the primary chain case cover is transferred to the release ramp and lever and onto the adjusting screw 155 and its shelf 155C and on through the spring loaded belleville washer 167 and onto the outer race of the releasing disc bearing 169 which in turn transfers it to the releasing disc 162, which transfers it to the pressure plate 172, which in turn transfers it to the clutch hub assembly 174 which subsequently comes to a rotational stop.

As previously noted, alternate embodiments according to the present invention may employ a bronze washer instead of the fiber washer 165, or one could replace the fiber washer 165 and metal belleville washer 167 with an appropriately dimensioned bronze belleville washer.

A further alternate embodiment would use a larger diameter, rigid, bronze washer, with the outer diameter chosen so as to impact a significant portion of the releasing disc 162. The bronze washer would again be slipped over the narrower end of the adjustment screw which slips into releasing disc bearing 169. The bronze washer would be free to rotate, while the clutch is engaged. However, during disengagement the adjustment screw is urged inward toward the releasing disc bearing 169. An inward force would now be exerted by the bronze washer, sandwiched between the releasing disc 162 and the shelf 155C of the releasing disc collar segment of the adjusting screw 155. It would thus transfer the friction or damping directly to the releasing disc 162, which would transfer it to the pressure plate 162, which would transfer it to the clutch hub assembly 174, which subsequently comes to a rotational stop, once again achieving the desired braking effect. This design has the added benefit of assisting the releasing disc 162 in maintaining a perpendicular alignment with the transmission main shaft during disengagement, being guided by the bearing at the outboard end. If one prefers a spring-loaded force, a belleville washer could once again be sandwiched between the bronze washer and the inner race of the releasing disc bearing 169 in an inverted orientation. That is, the inner diameter of the belleville washer would abut the inner race of the releasing disc bearing 169 and the outer diameter of the belleville washer would abut the bronze washer. As noted previously the clutch hub assembly 174 is not tightly linked to the clutch shell 176, in this design.

The clutch hub assembly comes to rest upon the inner race of the clutch shell bearing 178 and the design is such that a significant separation exists between the bottom of the clutch hub assembly 174 and the face of the clutch shell 176. Thus there is no tight linkage between these two components. If one holds the clutch hub assembly 174 in perpendicular alignment with the transmission main shaft, the clutch shell is still free to tilt relative to this perpendicular plane, in response to the forces applied to it. The result is a tilting of the clutch plates 164, 166 and 168, between these nonparallel faces, which results in clutch binding. To eliminate this one must provide the missing linkage. This is done by filling the gap between the machined, outer, bottom edge of the clutch hub assembly 174 and the interior face 176A of the clutch shell 176 with an appropriately dimensioned thrust bearing 182, also illustrated in FIG. 5. If a thrust bearing 182 with the appropriate inner diameter (to match the outer diameter of the portion of the clutch shell 176, which receives the clutch shell bearing 178) is not available, then the outer diameter of the portion of the clutch shell 176, which receives the bearing 178, must be enlarged by press fitting an alignment bushing 186 onto it. This alignment bushing 186 is designed to have an outer diameter, which is in slip fit agreement with the inner diameter of the thrust bearing 182 and its races 184A and 184B. The inner race 184A of the thrust bearing is then slipped over the alignment bushing 186 and comes to rest on the inside face 176A of the clutch shell 176. Next the thrust bearing 182 itself is slipped over the alignment bushing 186 and comes to rest on its inner race 184A. Next an outer race 184B is slipped over the alignment bushing and comes to rest on the thrust bearing 182. The outer race also supports the outer, bottom face of the clutch hub assembly 174, with an allowable tolerance. If the thickness of the thrust bearing assembly is not within allowable tolerances, then the gap between the clutch hub assembly 174 and the inside face 176A of the clutch shell 176 is modified with the use of shims 179 placed between the inner race of the clutch shell bearing 178 and the mating surface of the clutch hub assembly 174. Thus the gap between the bottom, outer edge of the clutch hub assembly 174 and the corresponding face 176A of the clutch shell 176 is eliminated and the two components are brought into a tightly linked relationship.

One can now rely on the original clutch design to maintain a tight coupling of the releasing disc 162 with the pressure plate 172, and subsequently with the inner clutch hub assembly 174. The clutch hub assembly 174 is now tightly linked with both the clutch shell 176 via the thrust bearing and also the clutch shell bearing 178. The clutch hub assembly is also tightly linked to the transmission main shaft with the hub nut 171. Furthermore, the entire clutch assembly is now being maintained in perpendicular alignment with the transmission mainshaft by its linkage to the modified adjustment screw 155, which is being retained in and guided by the bearing 153 at the outboard end. In this manner, a parallel arrangement of the encapsulated clutch disks 166 and 168, within the retaining ring, the outer drive plate 164, the releasing disc 162, the pressure plate 172, the clutch hub assembly 174, and the clutch shell 176, is maintained. Thus all clutch elements would at all times be maintained in perpendicular alignment with the transmission main shaft and the resultant benefits according to this embodiment are thus realized.

In 1991, some aspects of the Sportster clutch once again changed. However none of these changes impact the basic design. Referring to the official factory service manual, 1993 and 1994 XLH models, Harley-Davidson Part No. 99484-94, 1994, especially noting Figure 6–14 on page 6-10 and Figure 6–19 on page 6-15 therein, and elsewhere, incorporated by reference, the clutch inspection cover changed to one attached with socket screws. As illustrated in the manual figures, there were some other changes to the clutch itself from other years' designs. The clutch hub is now once again attached to the transmission main shaft with a main shaft nut. The manner in which the pressure plate attaches to the clutch hub is slightly modified. Instead of the snap ring fitting into slots on the inner side walls of the clutch hub through openings in the side of the pressure plate as in late 1984 to 1990, these slots are now contained in pillars which extend from the base of the clutch hub upward through openings in the central portion of the pressure plate. Otherwise, the clutch design is unchanged.

A modified adjusting screw is employed as with the embodiment 100 of FIG. 4 which adjusting screw is longer and comprises six segments, and the clutch inspection cover 201 is modified to accommodate the press-fit bearing 202. In the present embodiment, the adjusting screw according to the present invention begins with a male hex head 217A end section and then transitions to a smooth surface area 217B, and then transitions to the threaded section 217C employed in the original design, then to a snap ring slot 217D, then to the smooth section 217E which slips into the bearing 216 and then transitions to a shelf 217F on the butt or inward end, which supplies the contact to pull upon the pressure plate 218. The design of the clutch hub brake would also be unaltered.

Figure 7:
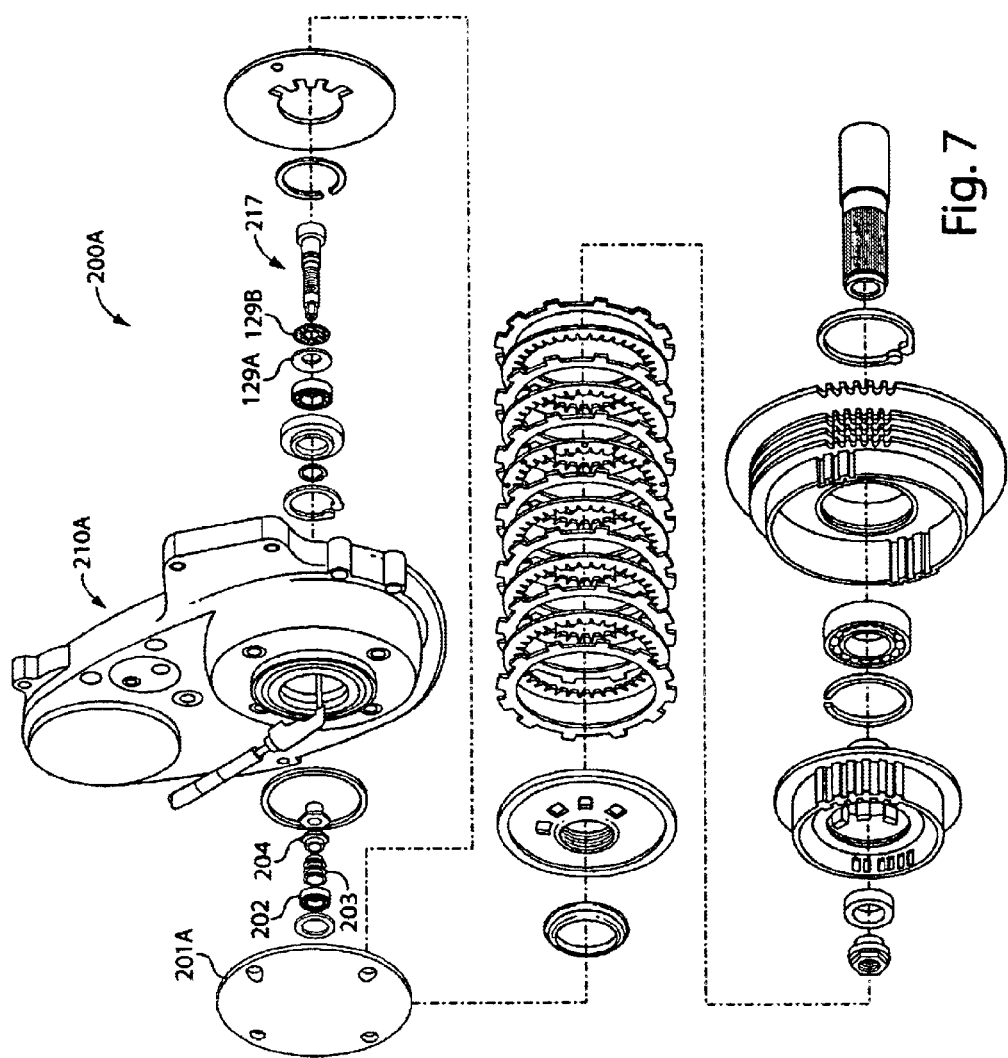
FIG. 7 is a perspective, exploded view of a further alternate embodiment according to the present invention.

As illustrated in FIG. 7, in the embodiment 200A, the clutch inspection cover was enlarged to accommodate the movement of the inner ramp and the outer ramp (obscured) from the inward side of the primary cover where it was attached using an inner lock plate and screws, to the outward side of the primary cover 210A. The inner ramp and the outer ramp now mate directly into the outer portion of the primary cover 210A negating the need for the inner lock plate. The clutch itself remains unchanged for the stock clutch. Thus, the retrofit kit according to the present invention provides a new clutch inspection cover 201A including and accommodating a press fit bearing 202, and the adjustment screw 217, a conical spring 203, a modified outer locking plate 204, and optionally the clutch hub brake (with washers 129A and/or 129B) as described above.

Further modifications and substitutions by one of ordinary skill in the art are within the scope of the present invention, which is not to be limited, except by the claims which follow.

What is claimed is:

1. A motorcycle clutch support for use with a motorcycle clutch having an output shaft on a first side of a clutch assembly having a housing thereover, comprising:

a mandrel tightly coupled to a clutch pressure plate; and a bearing assembly disposed to engage said mandrel and being retained by said clutch assembly housing.

2. The motorcycle clutch support of claim 1, wherein said bearing assembly is mounted on an access cover, said access cover being retained by said clutch assembly housing.

3. The motorcycle clutch support of claim 1, further including a clutch hub brake, wherein said clutch hub brake is disposed within said clutch assembly housing to engage when said motorcycle clutch is disengaged.

4. The motorcycle clutch support of claim 3, wherein said mandrel comprises a region of lesser diameter and a region of a larger diameter, said clutch hub brake comprises one of a fiber and a metal washer disposed on said mandrel to abut said larger diameter and to apply a force to said clutch assembly housing when said clutch hub brake is engaged.

5. The motorcycle clutch support of claim 4, wherein said clutch hub brake includes a resilient washer.

6. The motorcycle clutch support of claim 4, wherein said resilient washer comprises a belleville washer.

7. A motorcycle clutch support for use with a motorcycle clutch having an output shaft on a first side of a clutch assembly having a housing thereover, comprising:

a shaft tightly coupled to said output shaft; and a bearing assembly disposed to engage said shaft and being retained by said clutch assembly housing.

8. The motorcycle clutch support of claim 7, wherein said bearing assembly is mounted on an access cover, said access cover being retained by said clutch assembly housing.

9. A clutch brake for use with a motorcycle clutch including a clutch assembly having a housing thereover, comprising:

a clutch brake member;

a clutch assembly support and compression member connected to and rotatable with a portion of said clutch to be rotionally slowed by operation of said clutch brake, said clutch assembly support member adapted to receive said clutch brake member and apply a compression force thereto; and a clutch housing member disposed on said clutch housing and confronting said clutch brake member in spatial relationship to engage said clutch brake member when said motorcycle clutch is disengaged.

10. The clutch brake of claim 9, wherein said clutch assembly support comprises a region of lesser diameter and a region of a larger diameter, said clutch brake member comprises at least one of a fiber and a metal washer disposed on said clutch assembly support and compression member to abut said larger diameter and to apply a force to said clutch assembly housing when said clutch brake is engaged.

11. A clutch brake for use with a motorcycle clutch including a clutch assembly having a housing thereover, comprising:

a clutch brake member;

a clutch assembly support member adapted to receive said clutch brake member; and a clutch housing member disposed on said clutch housing and confronting said clutch brake member in spatial relationship to engage said clutch brake member when said motorcycle clutch is disengaged, wherein said clutch brake includes a resilient washer.

12. The clutch brake of claim 11, wherein said resilient washer comprises a belleville washer.

13. A motorcycle clutch enhancement kit for use with a motorcycle clutch having a clutch assembly, comprising a clutch mandrel tightly coupled to a clutch pressure plate, and having a shaft extending axially outward from said clutch assembly;

an access cover; and a bearing mounted on said access cover and disposed to receive said mandrel shaft and provide support to said mandrel shaft and to said clutch.

14. The motorcycle clutch enhancement kit of claim 13, wherein said access cover includes a recess to receive said bearing therein.

15. The motorcycle clutch enhancement kit of claim 13, further including a clutch hub brake disposed on said mandrel shaft to provide a force to said clutch assembly housing to said access cover when said motorcycle clutch is disengaged.

16. The motorcycle clutch enhancement kit of claim 15, wherein said mandrel comprises a region of lesser diameter and a region of a larger diameter, said clutch hub brake comprises one of a fiber and a metal washer disposed on said mandrel to abut said larger diameter and to apply a force to said clutch assembly housing when said clutch hub brake is engaged.

17. A motorcycle clutch enhancement kit for use with a motorcycle clutch having a clutch assembly, comprising a shaft axially coupled to a transmission shaft retaining said clutch assembly, said shaft extending axially outward from said clutch assembly;

an access cover; and a bearing mounted on said access cover and disposed to receive said shaft and provide support to said clutch assembly.

18. The motorcycle clutch enhancement kit of claim 17, wherein said access cover includes a recess to receive said bearing therein.

* * * * *